Aug. 28, 1962   G. MARKUS ETAL   3,051,600
ORNAMENTAL SHEET MATERIAL AND METHOD OF MAKING SAME
Original Filed July 22, 1955   2 Sheets-Sheet 1
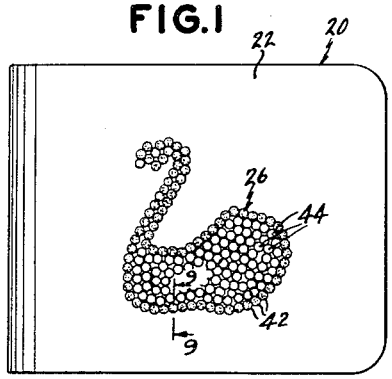
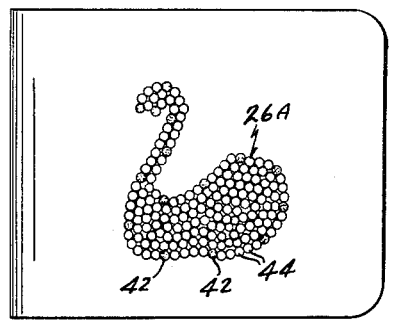
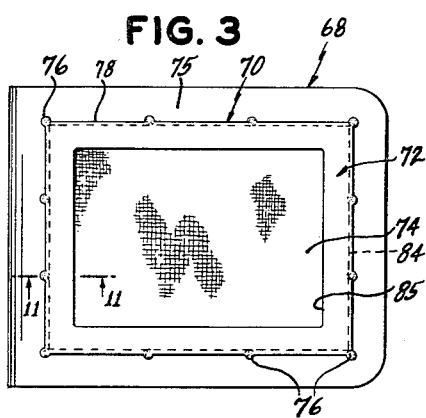
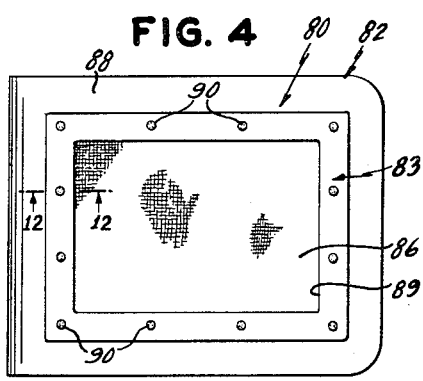
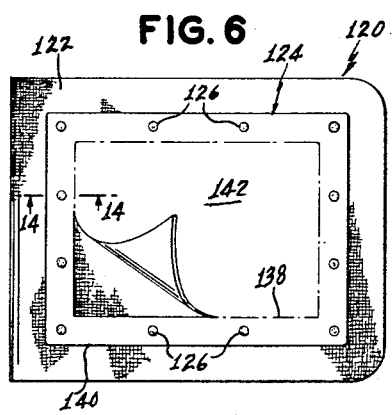
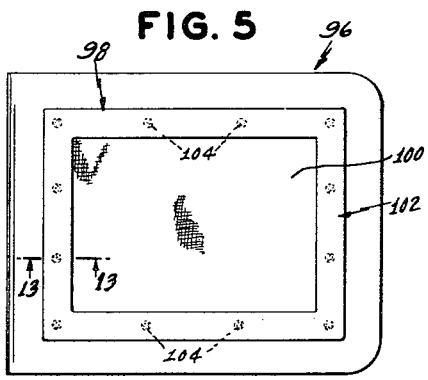
INVENTORS
George Markus
Martin Siegel
BY
ATTORNEYS Aug. 28, 1962 G. MARKUS ETAL 3,051,600
ORNAMENTAL SHEET MATERIAL AND METHOD OF MAKING SAME
Original Filed July 22, 1955 2 Sheets-Sheet 2
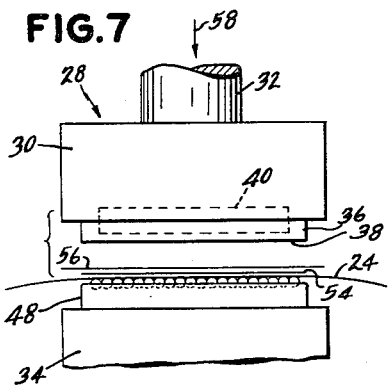
FIG. 7
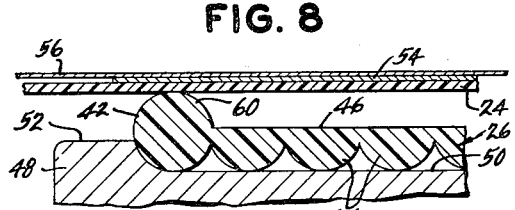
FIG. 8
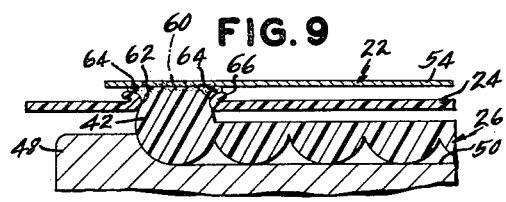
FIG. 9
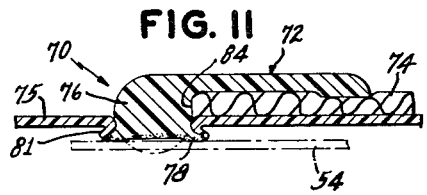
FIG. 11
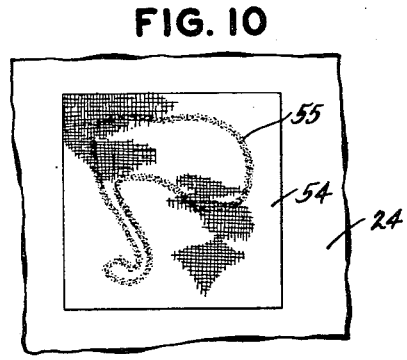
FIG. 10
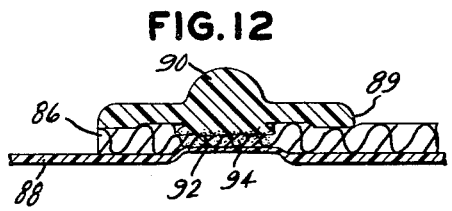
FIG. 12
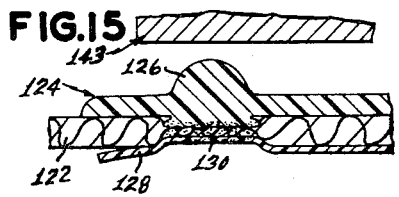
FIG. 15
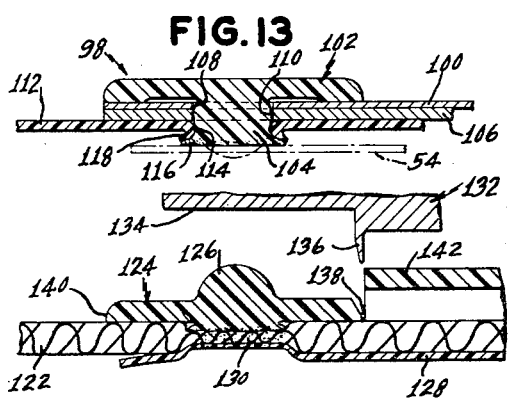
FIG. 13
FIG. 14
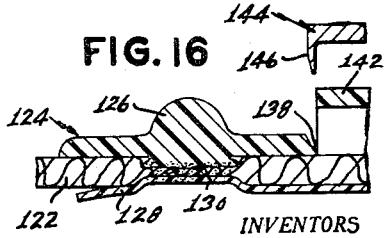
FIG. 16
INVENTORS
George Markus
Martin Siegel
BY
ATTORNEYS

United States Patent Office 3,051,600
Patented Aug. 28, 1962

3,051,600
ORNAMENTAL SHEET MATERIAL AND METHOD OF MAKING SAME
George Markus, West Orange, N.J., and Martin Siegel, Roslyn, N.Y., assignors to Aristocrat Leather Products, Inc., New York, N.Y., a corporation of New Jersey
Original application July 22, 1955, Ser. No. 523,716, now Patent No. 2,891,340, dated June 23, 1959. Divided and this application Sept. 30, 1958, Ser. No. 764,349
9 Claims. (Cl. 154—47)

The present invention relates generally to ornamental sheet material and to methods of making the same.

It is an object of the present invention to simplify the art of ornamenting sheet material and articles and to reduce the cost of manufacture of such ornamented sheet material and articles. Pursuant to this object of the present invention, plastic sheet material is ornamented by having ornamental elements secured thereto by a securing operation in which a minimum amount of the material of the ornamental element is required for the securing operation so as to greatly reduce the manufacturing cost thereof.

Another object of the present invention is the provision of a method of making an ornamented plastic sheet assembly by mechanically securing ornaments to plastic sheet material by the application of heat externally of said material.

Another object is the provision of a method of making an ornamented plastic sheet assembly by securing a plurality of ornaments to plastic sheet material wherein the securement of one of the ornaments to plastic sheet material is utilized to secure other ornaments thereto.

Another object is the provision of a generally improved method of the above character which can be practiced by the utilization of generally conventional apparatus.

The above and other objects, features and advantages of the present invention will be more fully understood from the following description considered in connection with the accompanying illustrative drawings.

In the drawings which illustrate the best modes now contemplated by us for carrying out our invention:

FIG. 1 is a side view of a wallet formed of ornamented sheet material embodying the present invention;

FIG. 2 is a view similar to FIG. 1 and illustrates a modification in the securement of the ornament to the sheet material;

FIG. 3 is a view similar to FIG. 1 and illustrates another type of ornamental assembly provided on the sheet material;

FIG. 4 is a view similar to FIG. 3 and illustrates a modification in the securement of the ornamental assembly to the plastic sheet material;

FIG. 5 is a view similar to FIG. 1 and illustrates an additional form of ornamental assembly secured on the sheet material;

FIG. 6 is a view similar to FIG. 1 and illustrates an ornamented fabric sheet material, showing a portion of a plastic ornament partially torn along a tear edge defined therein;

FIG. 7 is a side elevational view of a press showing an ornamented element and plastic sheet material positioned on the bed thereof preparatory to the securing operation;

FIG. 8 is a fragmentary sectional view, on a larger scale, taken through the bed of the press illustrated in FIG. 7, and illustrates the various components of an ornamental assembly in position prior to the mechanical securement of the ornamental element to the sheet material;

FIG. 9 is a view similar to FIG. 8 and illustrtates the ornamental element secured to the sheet material and corresponds substantially to the fragmentary sectional view, on an enlarged scale, taken on the line 9—9 of FIG. 1;

FIG. 10 is a fragmentary elevation illustrating the reverse surface of the sheet material provided with the ornamental element of FIG. 1;

FIG .11 is a sectional view, on an enlarged scale, taken on the line 11—11 of FIG. 3;

FIG. 12 is a sectional view, on an enlarged scale, taken on the line 12—12 of FIG. 4;

FIG. 13 is a sectional view, on an enlarged scale, taken on the line 13—13 of FIG. 5;

FIG. 14 is a sectional view taken on the line 14—14 of FIG. 6 and illustrates a die used to both seal the ornamental element to the sheet material and to provide a tear edge therein;

FIG. 15 is a view similar to FIG. 14 and illustrates a portion of a die used only to seal the ornamental element to the sheet material; and FIG. 16 is a view silimar to FIG. 15 and illustrates a portion of the die used only to provide the tear edge.

Referring now to the drawings in detail, and in particular to FIGS. 1 and 7 through 10, there is shown a wallet 20 formed of an ornamented plastic sheet assembly 22. Said sheet assembly 22 comprises a sheet 24 of plastic material having the molded plastic ornamental element 26 secured thereto. Said ornamental plastic sheet assembly is formed by securing the ornamental element 26 through the plastic sheet material 24 by the method which is hereinafter described in detail.

The apparatus 28, illustrated in FIG. 7, is utilized for the practice of the present invention. Said apparatus is conventional, in the main, and includes a head 30, mounted at the end of a vertically reciprocable ram 32, and a stationary bed 34. It will be understood that the ram 32 is mounted for vertical reciprocation, in any suitable manner, to vertically reciprocate the head 30 relative to its companion stationary bed 34. A die 36 is mounted, in any suitable manner, on the lower end of the head 30. The die 36 has a lower planar face 38 which is adapted to mechanically secure the ornamental element 26 to the plastic sheet material 24, as hereinafter described in detail. The ornamental element is adapted to be secured to the plastic sheet material 24 by heat applied externally of said sheet material, there being provided any suitable heating means 40 in the head 30, in the apparatus 28, for heating the die 36 to the desired operating temperature.

As here shown, the ornamental member 26 is provided, at its periphery, with a continuous row of interconnected spherical stud-defining portions 42, and inwardly of said studs, said member is formed of hemispherical interconnected portions 44, the adjacent spherical portions 42 being interconnected with adjacent hemispherical portions 44, as best illustrated in FIG. 8. It will be understood that the ornamental element or member 26 is prefabricated in any suitable manner and is formed of a suitable thermoplastic material, such as for example and not by way of limitation, a suitable acetate. The planar surface 46, defined by the hemispherical portions 42, represents the inner surface of the ornamental member 26 so that, at the outer surface thereof, as illustrated in FIG. 1, there is no indication that the portions 44 differ from the portions 42, whereby to provide a uniform or homogeneous surface appearance at the outer surface of the ornamental member 26.

A suitable retainer 48 is disposed on the bed 34 of the apparatus 28. Said retainer is recessed, as at 50, so as to define a seat for receiving the ornamental member 26, with the planar surface portion 46 thereof uppermost, as is best illustrated in FIGS. 8 and 9. The seat 50 is of relatively shallow formation so that the major portion of the spherical peripheral portions or studs 42, of the member 26, will project upwardly of the face 52 of said retainer. In the illustrated embodiment, the seat 50 is adapted to support the ornamental member 26 so that approximately two-thirds of each spherical portion 42 will project upwardly from the face 52 of the retainer.

After the plastic ornamental member 26 is positioned in the shallow seat 50, as illustrated in FIG. 8, the plastic sheet material 24 is superposed thereon as illustrated. Said sheet material may be of any suitable thermoplastic material, for example and not by way of limitation, the sheet material may be formed of vinyl. An open mesh, foraminous or intersticed non-thermoplastic sheet material 54, such as for example and not by way of limitation, buckram, is then superposed on the plastic sheet material 24, to cover the area of the sheet material 24 over the studs 42. The heated die face 38 is applied to the surface of the foraminous fabric 54, with a parting agent 56 disposed between said die face and the fabric 54. The parting agent is constituted by a thin sheet of thermal conducting material, for example a sheet of aluminum foil, the latter constituting a parting agent between the die and the fabric 54 and being effective to conduct heat through the open mesh fabric 54 to the sheet material 24 and the ornamental member 26 during the securing operation.

With the sheet of aluminum foil 56 disposed on the fabric 54, the ram 32 is reciprocated in a downward direction, as indicated by the arrow 58, so as to reciprocate the die face 38 in a downward direction into operative engagement with the work mounted on the bed 34. The engagement of the heated die face with the sheet of aluminum foil 56 and the underlying plastic sheet material 24, provides for the penetration of the projecting portion 60 of each stud portion 42 of the ornamental member 26 through the sheet material 24 to form openings 62 through the latter. The heated die also provides for the softening and partial flattening of the stud projecting portion 60 from the broken line condition thereof in FIG. 9 to upset the latter, as at 64, to overlie the curled portion 66 of sheet 24 which defines the aperture 62. In addition, the thermoplastic material, of which the ornamental member 26 is fabricated, is softened sufficiently at the stud portion 60, to flow into the foraminations or interstices in the fabric 54, as shown by the outline 55, of the ornamental member 26, formed at the upper or outer surface of the fabric 54 by the solidification of the thermoplastic material, as illustrated in FIG. 10. Therefore, it will be apparent that the die 36 provides the requisite amount of heat and pressure for the securement of member 26 in situ on sheet 24 by the penetration of the projecting portions 60 of the studs 42 of the ornamental member through the plastic sheet member 24, and renders said projecting portion sufficiently fluid so that the thermoplastic material will penetrate the foraminations or interstices of the open mesh sheet material 54 and will be upset over the curled portions 66, as at the rim 64. Upon the retraction of the die 36, and the subsequent setting or solidification of the thermoplastic material in the open mesh fabric 54, the latter is secured to the flattened projecting portions 60 of the studs 42, as best illustrated in FIG. 9 so as to constitute an adhering retainer to prevent the inadvertent separation of the ornamental member 26 from the sheet material member 24. However, it will be understood that under certain conditions the open mesh member 54 may be omitted so that the member 26 will be retained on the sheet material member 24 solely by the mechanical securement constituted by the upset rims 64 formed by the heat and pressure applied by the die 36.

Referring now to FIG. 2 in detail, there is shown a molded ornamental member 26A which is similar to the ornamental member 26, with the exception that the periphery of the ornamental member 26A is not made up of a continuous row of studs 42. More specifically, it will be noted that the periphery of the ornamental member 26A is constituted by both the spherical studs 42 and the hemispherical portions 44, as illustrated. The hemispherical portions 44 outnumber the studs 42 so as to provide a considerable saving in the material of which the ornamental member 26A is molded. The ornamental member 26A is secured to a thermoplastic sheet member 24 in the same manner, as described in connection with the securement of the ornamental member 26 to a plastic sheet member, with the exception that due to the presence of both the studs 42 and the hemispherical portions 44 at the periphery of the ornamental member 26A, the latter is secured only at spaced points peripherally thereof, to the plastic sheet material 24. Said spaced points are the points along its periphery at which the ornamental member 26A is provided with the studs 42, as illustrated in FIG. 2.

Referring now to FIGS. 3 and 11 in detail, there is illustrated a wallet 68 which is provided on one wall thereof with a composite ornamental assembly 70. Said assembly comprises an ornamental open frame member 72 which is molded from suitable thermoplastic material, and a layer of suitable fabric sheet material 74. The fabric 74 may be either a closely knit fabric or it may be an open mesh or loosely knit fabric. The ornamental assembly 70 is mechanically secured to a thermoplastic sheet material 75 of which the wallet 68 is formed. More specifically, the frame member 72 is provided with the spherical projections or studs 76 which are peripherally spaced about the outer rim or edge 78 of the frame member 72. Said studs 76 correspond to the studs 42 of the ornamental members 26 and 26A, previously described, and are adapted to penetrate the thermoplastic sheet member 75 and be upset thereover, as at the rim 78 formed over the curled over portions 81 of member 75, to provide for the mechanical securement of the frame 72 to the sheet material member 75.

In effecting the securement of the assembly 70 to the sheet material member 75, the frame member 72 is first positioned in a complementary retainer 48 with the studs 76 projecting from the retainer, in the same manner as previously described in connection with ornamental member 26. A sheet of fabric material 74 is then superposed on member 72, the fabric member terminating inwardly of the studs 76 so as to lie within said studs, as indicated by the marginal periphery 84 of said fabric member, the thermoplastic sheet member 75 is then superposed over the fabric 74 so as to abut the studs 76. A parting member 56 is then superposed over the sheet member 75 and the press 28 is operated, as previously described. As in the case of the ornamental members 26 and 26A, the studs 76 are pressed by the heated die 38 from the broken line position thereof, in FIG. 11, to provide the upset rim 78 to effect the required mechanical securement of the frame to the sheet material member 75, said securement of the frame retaining the fabric in position on the sheet member 75 and exposed through the opening 85 in the frame. In addition, provision may be made for the previously described adhering member 54, which is of open mesh construction, so that the thermoplastic material when liquified may flow into the interstices to prevent the inadvertent separation of the studs 76 from the sheet material member 75, upon solidification of the liquified material.

Referring now to FIGS. 4 and 12 in detail, there is shown a decorative assembly 80 which is secured to the wallet 82. The assembly 80 comprises an open frame member 83 molded of suitable thermoplastic material, provided on a layer 86 of textile material and fused through the latter to the plastic sheet material member 88 of which the wallet 82 is formed. The open frame member 83 is provided with the studs 90 which are similar to the studs in the previously described embodiments. As here shown, the studs 90 are provided at spaced intervals on the frame member 83, and project from the opposite surfaces thereof. The textile material 86 may be of any conventional construction, for example and not by way of limitation, a woven or knitted construction, the former being presently preferred.

The thermoplastic frame member 83 is disposed in a complementary retainer 48 with the portions 92 of the studs 90 projecting from the retainer. The textile layer 86 is then disposed on the frame 83, it being noted that said layer is coextensive with the frame. The thermoplastic sheet member 88 is then superposed on the textile or fabric layer. The frame 83 is heat sealed or fused to the plastic layer 88 through the use of conventional electronic or dielectric equipment in the head of the press, as illustrated and described in detail in our copending application, Serial No. 509,836, now Patent No. 2,729,009, filed May 20, 1955, and assigned to the assignee hereof. In this connection, it will be understood that in lieu of the heating element 40 in the press head 30 illustrated in FIG. 7, the head 30 of the press 28 is provided with conventional dielectric heating equipment for the die thereof, which is of proper contour to press the studs 90 of the frame member 83 against the plastic sheet material 88. More specifically, it will be understood that the lower projecting portion 92, viewing FIG. 12, of the stud 90 is fused or heat sealed to the underlying plastic sheet material 88 by the press. This bonding or fusing of the thermoplastic frame member 83 to the plastic sheet material 88 is effected when plastic material from each of the frame member and the plastic sheet material member flow through the interstices of the textile layer 86, as indicated at 94, so as to effect a fusion of the frame member to the underlying plastic sheet material member 88, at each of the spaced studs 90, through the textile material 86. The securement of the frame member 83 to the plastic sheet material 88 at spaced intervals along said frame member results in the securement of the textile member 86 in position therebetween with the latter exposed through the frame opening 89.

Referring now to FIGS. 5 and 13 in detail, there is illustrated a wallet 96 which is provided with an ornamental assembly 98 having a textile or fabric layer 100 formed of tightly woven material or material which is relatively thin and fine, for example and not by way of limitation, said material may be silk or satin. In addition to the textile layer 100, the ornamental assembly 98 also includes an open frame 102 provided with the spherical portions or studs 104, at spaced intervals on the inner or lower surface thereof, viewing FIG. 13, and a backing or filler member 106, preferably formed of cardboard or similar material, which underlies the fabric layer 100 and which provides a firm backing therefor. Both the textile layer 100 and the cardboard backing layer 106 are each provided with preformed apertures 108 and 110, respectively, which register with the projecting studs 104 on the frame member 102. In effecting the securement of the ornamental assembly 98 on the material member 112, of which the wallet 96 is formed, a press, such as press 28, having a properly contoured die for the frame member 102 is utilized, said die being heated by a heating element, such as 40. The frame 102 is disposed in a complementary retainer 48 with the studs 104 projecting therefrom. The fabric or textile layer 100, which is coextensive with the frame, is disposed thereon with the studs 104 projecting through the apertures 108 in layer 100. The backing member 106, which is coextensive with the layer 100, is superposed on the latter with the studs 104 projecting through the apertures 110 therein. The thermoplastic sheet material member 112 is then superposed over the backing member 106, in abutment with the studs 104. A parting member 56 is superposed on the plastic sheet member 112. As in the case of the embodiments previously described in connection with FIGS. 8, 9 and 11, the press operates to force the studs 104, which project through the aligned apertures 108 and 110 of the fabric layer 100, and the backing member 106, respectively, through the plastic sheet material 112 to form the openings 114 in the latter. The studs are deformed from the broken line position thereof, under the pressure and the heat, to form a peripheral rim 116 which overlies the curled portion 118, of the sheet material member 112 which defines the opening 114, in the same manner as previously described. The rim 116, overlying the curled portion 118 forms a mechanical securement of the frame member 102 to the sheet material 112 through the textile layer 100 and the backing layer 106. If additional securement is desired, an adhering member 54, as previously described, is superposed on the plastic sheet material member 112 before the press head is moved down, and the plastic material of the studs 104 flowing into the interstices of the adhering member 54 serves to provide for said additional securement. However, it will be understood, that the adhering layer 54 may be dispensed with where the mechanical securement of the frame member 98 at the spaced studs 104, to the plastic sheet material member 112 is sufficient.

Referring now to FIGS. 6 and 14 in detail, there is shown a wallet 120 which is formed of fabric or textile sheet material 122 on which there is provided an ornamental element 124. In the present embodiment the ornamental element is a substantially rectangular member 124, formed of thermoplastic material and provided adjacent the marginal edges thereof with the spaced spherical portions of studs 126 which are similar to the studs 90 in FIG. 12. In securing the ornamental member 124 to the fabric base member 122, the fabric member is interposed or sandwiched between the ornamental member 124 and a sheet of thermoplastic material 128 which constitutes a retainer for the ornamental member 124. As in the case of the embodiment illustrated in FIGS. 4 and 12, the ornamental member 124 is fused to the plastic retainer 128 through the use of conventional dielectric heating equipment so that the plastic material of both the ornamental member 124 and the retainer member 128 will flow into the interstices of the fabric base material 122, as at 130, to heat seal or fuse the member 124 to the member 128 at the various studs 126. However, in the present embodiment, as fully illustrated and described in our previously identified copending application, provision is made for a die 132 in the dielectric heating apparatus which has a planar die face 134 properly contoured to press the studs 126 against the plastic retainer member 128 to provide the desired heat sealing or fusing thereof, the die being additionally provided with a cutting edge 136. Said cutting edge provides a tear edge 138, inwardly of the peripheral edge 140 of the ornamental member 124, and inwardly of the studs 126, whereby the portion 142 of the member 124, within the tear edge 138, may be readily removed or torn therefrom, as illustrated in FIG. 6, to reveal the underlying textile base material 122 through the perture defined in the member 124 by the removed material.

While FIG. 14 illustrates the securement of the ornamental member 124 to the fabric base 122, and the formation of the tear edge 138 in the ornamental member in one operation, the sealing operation and formation of the tear edge may be accomplished, if desired in two separate operations, as illustrated in FIGS. 15 and 16. As illustrated in FIG. 15, the dielectric heating apparatus is provided with a die 143 which is of proper contour to effect the fusing of the studs 126 to the plastic retainer member 128, as described in connection with FIG. 14. Thereafter, the textile base material provided with the ornamental member 124 may be transferred to another press of conventional construction, having a die 144 provided with a cutting edge 146 to define the previously described tear edge 138, about the portion 142. When the portion 142 is torn or removed from the remainder of the ornamental member 124 there is provided an open frame which is similar to the frame 84 in FIG. 4.

The present application is a continuation-in-part of our co-pending application, Serial No. 471,046, filed November 24, 1954, now Patent No. 2,723,477, dated November 15, 1955, and assigned to the assignee hereof. Certain features described and shown herein are claimed in our previously identified copending application, Serial No. 509,836, now Patent No. 2,729,009, dated January 3, 1956, and in our copending application, Serial No. 490,869, filed February 28, 1955, now Patent No. 2,729,010, dated January 3, 1956, and assigned to the assignee hereof.

This application is a division of our application Serial No. 523,716, filed July 22, 1955, now Patent No. 2,891,340.

While we have shown and described the preferred embodiments of our invention, it will be understood that various changes may be made in the idea or principles of the invention within the scope of the appended claims.

Having thus described our invention, what we claim and desire to secure by Letters Patent is:

1. A method of making an ornamental sheet assembly, comprising providing a frame member of sheet material having a marginal edge portion extending along the periphery of said member and an opening positioned inwardly of said periphery and a series of thermoplastic studs spaced from each other along the length of said edge portion and projecting from a surface thereof, superposing a non-thermoplastic sheet member on said surface of said edge portion inwardly of said studs and in position covering said opening, superposing thermoplastic sheet material on said studs and in position overlying and covering said non-thermoplastic sheet member, and applying heat and pressure on said thermoplastic sheet material so that said studs penetrate the overlying portions of said thermoplastic sheet material and form apertures therein and parts of said studs project through said apertures and are upset in situ and overlie the portions of said thermoplastic sheet material adjacent said apertures to form a mechanical securement between said frame member and said thermoplastic sheet material with the non-thermoplastic member secured in position therebetween and visible through said opening.

2. A method of making an ornamental sheet assembly, comprising providing a frame member of sheet material having a marginal edge portion extending along the periphery of said member and an opening positioned inwardly of said periphery and a series of thermoplastic studs spaced from each other along the length of said edge portion and projecting from a surface thereof, providing a non-thermoplastic sheet member having a series of apertures arranged to correspond to the arrangement of said studs, superposing said non-thermoplastic sheet member on said frame member in position overlying and covering said opening with said apertures in registry with said studs so that the latter project through the companion apertures, superposing thermoplastic sheet material on said studs in position overlying and covering said non-thermoplastic sheet member, and applying heat and pressure on said thermoplastic sheet material so that said studs penetrate the overlying portions of said thermoplastic sheet material and form apertures therein and parts of said studs project through said formed apertures and are upset in situ and overlie the portions of said thermoplastic sheet material adjacent said formed apertures to form a mechanical securement between said frame member and said thermoplastic sheet material with said non-thermoplastic member secured in position therebetween and visible through said opening.

3. A method of making an ornamental sheet assembly, comprising providing a frame member of sheet material having a marginal edge portion extending along the periphery of said member and an opening positioned inwardly of said periphery and a series of thermoplastic studs spaced from each other along the length of said edge portion and projecting from a surface thereof, superposing a non-thermoplastic intersticed sheet member on said frame member in position overlying said studs and covering said opening, superposing thermoplastic sheet material in position overlying and covering said non-thermoplastic sheet material and said studs, and applying heat and pressure on said thermoplastic sheet material so that said studs are fused in situ to the overlying portions of said thermoplastic sheet material through the overlying intersticed portions of said non-thermoplastic member to form a mechanical securement between said frame member and said thermoplastic sheet material with the non-thermoplastic intersticed member secured in position therebetween and visible through said opening.

4. A method of making an ornamental sheet assembly, comprising providing a sheet of thermoplastic material having a series of thermoplastic studs projecting from a surface of said thermoplastic sheet, superposing a sheet of non-thermoplastic intersticed material on said studs in position overlying and covering said thermoplastic sheet and said studs, superposing another sheet of thermoplastic material in position overlying and covering said intersticed sheet and said studs, applying heat and pressure on said other sheet of thermoplastic material to fuse said studs in situ to the overlying portions of said other sheet of thermoplastic material through the overlying portions of said intersticed sheet to form a mechanical securement between said first mentioned sheet and said other sheet with said intersticed sheet secured in position therebetween, and providing a tear edge in said first mentioned sheet material concurrently with said fusing inwardly of said studs so that a portion of said first mentioned sheet material can be removed to expose the underlying portion of said intersticed sheet.

5. A method of making an ornamental sheet assembly, comprising providing a sheet of thermoplastic material having a series of thermoplastic studs projecting from a surface of said thermoplastic sheet, superposing a sheet of non-thermoplastic intersticed material on said studs in position overlying and covering said thermoplastic sheet and said studs, superposing another sheet of thermoplastic material in position overlying and covering said intersticed sheet and said studs, applying heat and pressure on said other sheet of thermoplastic material to fuse said studs in situ to the overlying portions of said other sheet of thermoplastic material through the overlying portions of said intersticed sheet to form a mechanical securement between said first mentioned sheet and said other sheet with said intersticed sheet secured in position therebetween, and thereafter providing a tear edge in said first mentioned sheet material after said fusing inwardly of said studs so that a portion of said first mentioned sheet material can be removed to expose the underlying portion of said intersticed sheet.

6. Ornamental sheet material, comprising a layer of sheet material having a series of thermoplastic studs projecting from a surface of said layer, a layer of thermoplastic sheet material overlying said first mentioned layer and said studs, and a layer of non-thermoplastic sheet material interposed between said layers of sheet material, said studs having portions which extend through said non-thermoplastic layer and are heat fused in situ to the overlying portions of said layer of thermoplastic sheet material to secure all of the layers of material to each other with said non-thermoplastic layer secured between the other layers of material.

7. Ornamental sheet material, comprising a frame member of sheet material having a marginal edge portion extending along the periphery of said member and an opening positioned inwardly of said periphery and a series of thermoplastic studs spaced from each other along the length of said edge portion and projecting from a surface thereof, a layer of thermoplastic sheet material overlying said studs and covering said opening, and a layer of non-thermoplastic sheet material interposed between said frame member and said thermoplastic sheet material inwardly of said studs and in position covering said opening, said studs projecting through apertures made by said studs in the overlying portions of said thermoplastic sheet material as a result of the application of heat and pressure to the latter and having parts which are upset in situ and overlie the portions of said thermoplastic sheet material adjacent said apertures to form a mechanical securement between said frame member and said thermoplastic sheet material with the non-thermoplastic member secured in position therebetween and visible through said opening.

8. Ornamental sheet material, comprising a frame member of sheet material having a marginal edge portion extending along the periphery of said member and an opening positioned inwardly of said periphery and a series of thermoplastic studs spaced from each other along the length of said edge portion and projecting from a surface thereof, a non-thermoplastic sheet member having a series of apertures arranged to correspond to the arrangement of said studs, said sheet member being superposed on said frame member in position overlying and covering said opening with said apertures in registry with said studs so that the latter project through the companion apertures, and a layer of thermoplastic sheet material superposed on said studs in position overlying and covering said sheet member, said studs projecting through apertures made by said studs in the overlying portions of said thermoplastic sheet material as a result of the application of heat and pressure to the latter and having parts which are upset in situ and overlie the portions of said thermoplastic sheet material adjacent said apertures to form a mechanical securement between said frame member and said layer of thermoplastic sheet material with said non-thermoplastic member secured in position therebetween and visible through said opening.

9. Ornamental sheet material, comprising a frame member of sheet material having a marginal edge portion extending along the periphery of said member and an opening positioned inwardly of said periphery and a series of thermoplastic studs spaced from each other along the length of said edge portion and projecting from a surface thereof, a layer of thermoplastic sheet material overlying said studs, and a layer of non-thermoplastic intersticed sheet material interposed between said frame member and said thermoplastic sheet material in position overlying said studs and covering said opening, said studs having portions which are fused in situ to the overlying portions of said thermoplastic sheet material through the overlying intersticed portions of said non-thermoplastic member to form a mechanical securement between said frame member and said thermoplastic sheet material with the non-thermoplastic intersticed member secured in position therebetween and visible through said opening.

References Cited in the file of this patent

UNITED STATES PATENTS

| | | |
|---|---|---|
| 2,390,021 | Wolf | Nov. 27, 1945 |
| 2,397,743 | Kaphan | Apr. 2, 1946 |
| 2,710,046 | Markus et al. | June 7, 1955 |
| 2,723,477 | Markus et al. | Nov. 15, 1955 |
| 2,729,010 | Markus et al. | Jan. 3, 1956 |
| 2,816,853 | Meyers | Dec. 17, 1957 |
| 2,891,340 | Markus et al. | June 23, 1959 |